(12) United States Patent
Wouters et al.

(10) Patent No.: US 12,078,271 B2
(45) Date of Patent: Sep. 3, 2024

(54) BRACKETS AND METHODS OF MANUFACTURE AND USE THEREOF

(71) Applicant: DiversiTech Corporation, Duluth, GA (US)

(72) Inventors: Thomas Wouters, Duluth, GA (US); Dale Harrison, Duluth, GA (US); Chris Willette, Duluth, GA (US)

(73) Assignee: DiversiTech Corporation, Duluth, GA (US)

( * ) Notice: Subject to any disclaimer, the term of this patent is extended or adjusted under 35 U.S.C. 154(b) by 0 days.

(21) Appl. No.: 18/098,666

(22) Filed: Jan. 18, 2023

(65) Prior Publication Data
US 2023/0228347 A1    Jul. 20, 2023

Related U.S. Application Data

(63) Continuation-in-part of application No. 17/300,321, filed on Jan. 19, 2022.

(51) Int. Cl.
*F16L 3/22*   (2006.01)
*F16L 3/237*  (2006.01)
*H02G 3/04*   (2006.01)

(52) U.S. Cl.
CPC ............ *F16L 3/221* (2013.01); *F16L 3/237* (2013.01); *H02G 3/0456* (2013.01)

(58) Field of Classification Search
CPC .. F16L 3/221; F16L 3/238; F16L 3/13; H02G 3/0456; H02G 3/32
USPC ............. 248/74.2, 229.16, 229.13–229.15, 248/47–74.3, 65, 68.1
See application file for complete search history.

(56) References Cited

U.S. PATENT DOCUMENTS

| | | | | |
|---|---|---|---|---|
| 478,092 | A * | 7/1892 | Cushman | B62J 11/00 |
| | | | | 24/339 |
| 2,191,782 | A * | 2/1940 | Ernest | A61G 7/05 |
| | | | | 24/339 |
| 2,828,525 | A * | 4/1958 | Gail | F16L 33/04 |
| | | | | 24/279 |
| 3,907,239 | A * | 9/1975 | Ehrlich | F16B 2/245 |
| | | | | 24/339 |
| 4,971,273 | A * | 11/1990 | Huerre | H01J 29/003 |
| | | | | 248/74.2 |
| 5,697,591 | A * | 12/1997 | Cooper | F21V 21/08 |
| | | | | 362/396 |
| 6,631,876 | B1 * | 10/2003 | Phillips | F16B 2/22 |
| | | | | 248/74.2 |

(Continued)

OTHER PUBLICATIONS

Fresh-Aire UV, Blue-Tube XL, Installation & Maintenance (8 pages).

(Continued)

*Primary Examiner* — Christopher Garft
(74) *Attorney, Agent, or Firm* — Dentons US LLP (57) ABSTRACT

This disclosure enables various brackets and methods of manufacture and use thereof. For example, a bracket may have a first clip, a second clip, and a third clip, where the second clip spans between the first clip and the third clip to enable the bracket to be capable of simultaneously engaging (e.g., holding, clamping) a first tubular member (e.g., a tube, a socket, a bulb) by the first clip and the third clip and a second tubular member (e.g., a tube, a socket, a bulb) by the second clip as the first tubular member extends along the second tubular member.

42 Claims, 8 Drawing Sheets

(56) References Cited

U.S. PATENT DOCUMENTS

2009/0179115 A1\* 7/2009 Shen .................. F16L 3/08
 248/65
2019/0190244 A1\* 6/2019 Troughton ........... H01B 7/0045

OTHER PUBLICATIONS

Fresh-Aire UV, Airborne Duct Kit Installation Guide (2 pages).
Fresh-Aire UV, Commercial Series Accessories (1 page).
Fresh-Aire UV, TRS Kit, Installation Guide (1 page).

\* cited by examiner

FIG. 1

Prior Art

FIG. 2

Prior Art

Prior Art

Rectilinear finger    Arcuate finger

FIG. 14B

BRACKETS AND METHODS OF MANUFACTURE AND USE THEREOF

CROSS-REFERENCE TO RELATED PATENT APPLICATION

This patent application is a continuation-in-part of U.S. non-provisional patent application Ser. No. 17/300,321 filed 19 Jan. 2022, which is incorporated by reference herein for all purposes.

TECHNICAL FIELD

This disclosure relates to brackets.

BACKGROUND

Figure 1:
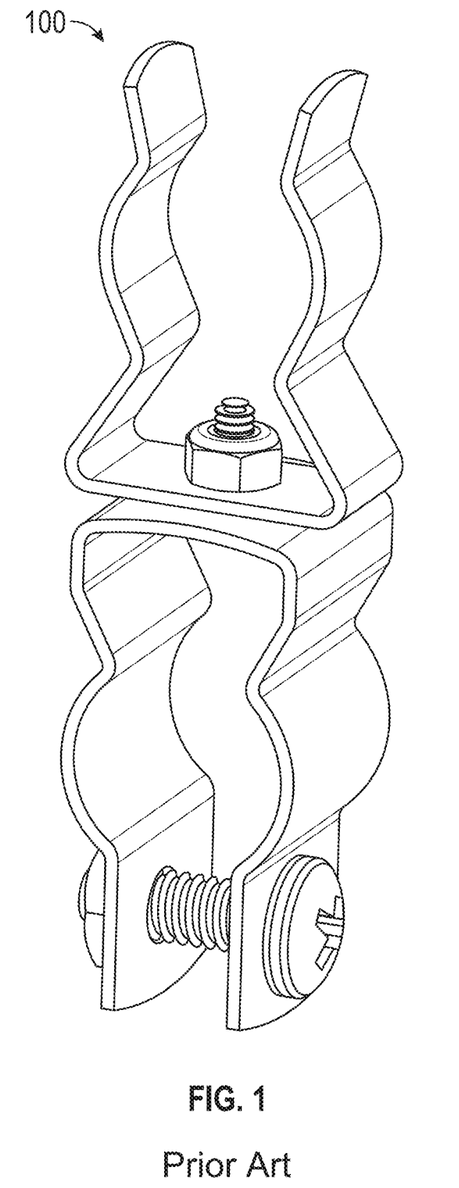
FIG. 1 to FIG. 2 show an assembly.
Figure 2:
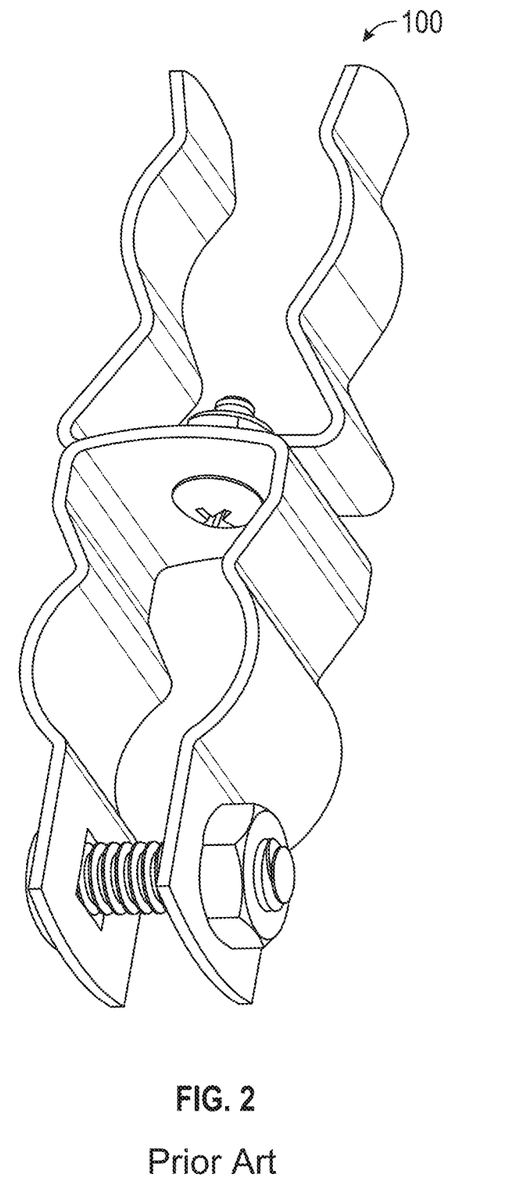

FIG. 1 to FIG. 2 show an assembly 100 having a first clip, a second clip, a first bolt, a first nut, a second bolt, and a second nut, where the first clip is fastened to the second clip via the first bolt and the first nut, and where the first clip is controlled via the second bolt and the second nut. The assembly 100 may be used within an air handling unit (e.g., an indoor unit of a mini-split air conditioner), where the first clip may engage (e.g., hold) a tube and the second clip may engage (e.g., hold) an ultraviolet (UV) bulb to enable a germicidal irradiation within the air handling unit. Although the assembly 100 may sometimes be useful, the assembly 100 still suffers from various technological drawbacks. First, the assembly 100 has the first clip fastened to the second clip, which may be time-consuming or laborious to manufacture, especially onsite. Second, the assembly 100 has the first clip, the second clip, the first bolt, the first nut, the second bolt, and the second nut, which may be excessive, costly, or subject to supply shortages. Third, the assembly 100 is limited to specific installation scenarios within the air handling unit. Fourth, the first bolt or the first nut may become loosened over time relative to the first clip or the second clip, thereby causing the first clip or the second clip to move or become unsecured relative to each other.

SUMMARY

Generally, this disclosure enables various brackets and methods of manufacture and use thereof. These brackets address at least some of the various technological drawbacks noted above. For example, a bracket may have a first clip, a second clip, and a third clip, where the second clip spans between the first clip and the third clip to enable the bracket to be capable of simultaneously engaging (e.g., holding, clamping) a first tubular member (e.g., a tube, a socket, a bulb) by the first clip and the third clip and a second tubular member (e.g., a tube, a socket, a bulb) by the second clip as the first tubular member extends along the second tubular member.

There may be a device, comprising: a bracket including a first clip, a second clip, and a third clip, wherein the first clip includes a first base and a first pair of fingers extending from the first base such that the first pair of fingers oppose each other, wherein the second clip includes a second base and a second pair of fingers extending from the second base such that the second pair of fingers oppose each other, wherein the third clip includes a third base and a third pair of fingers extending from the third base such that the third pair of fingers oppose each other, wherein the second base spans between the first base and the third base, wherein the bracket is capable of simultaneously engaging (1) a first tubular member by the first clip and the third clip when the first tubular member extends along the second base between the first pair of fingers and the third pair of fingers and (2) a second tubular member by the second clip when the second tubular member extends between the second pair of fingers along the first tubular member and the first base or the third base such that the second base extends between the first tubular member and the second tubular member.

There may be a method, comprising: causing a bracket to be accessed, wherein the bracket including a first clip, a second clip, and a third clip, wherein the first clip includes a first base and a first pair of fingers extending from the first base such that the first pair of fingers oppose each other, wherein the second clip includes a second base and a second pair of fingers extending from the second base such that the second pair of fingers oppose each other, wherein the third clip includes a third base and a third pair of fingers extending from the third base such that the third pair of fingers oppose each other, wherein the second base spans between the first base and the third base; causing the bracket to simultaneously engage (1) a first tubular member by the first clip and the third clip when the first tubular member extends along the second base between the first pair of fingers and the third pair of fingers and (2) a second tubular member by the second clip when the second tubular member extends between the second pair of fingers along the first tubular member and the first base or the third base such that the second base extends between the first tubular member and the second tubular member.

There may be a method, comprising: supplying a bracket to a user, wherein the bracket including a first clip, a second clip, and a third clip, wherein the first clip includes a first base and a first pair of fingers extending from the first base such that the first pair of fingers oppose each other, wherein the second clip includes a second base and a second pair of fingers extending from the second base such that the second pair of fingers oppose each other, wherein the third clip includes a third base and a third pair of fingers extending from the third base such that the third pair of fingers oppose each other, wherein the second base spans between the first base and the third base, wherein the bracket is capable of simultaneously engaging (1) a first tubular member by the first clip and the third clip when the first tubular member extends along the second base between the first pair of fingers and the third pair of fingers and (2) a second tubular member by the second clip when the second tubular member extends between the second pair of fingers along the first tubular member and the first base or the third base such that the second base extends between the first tubular member and the second tubular member.

There may be a method, comprising: manufacturing a bracket to a user, wherein the bracket including a first clip, a second clip, and a third clip, wherein the first clip includes a first base and a first pair of fingers extending from the first base such that the first pair of fingers oppose each other, wherein the second clip includes a second base and a second pair of fingers extending from the second base such that the second pair of fingers oppose each other, wherein the third clip includes a third base and a third pair of fingers extending from the third base such that the third pair of fingers oppose each other, wherein the second base spans between the first base and the third base, wherein the bracket is capable of simultaneously engaging (1) a first tubular member by the first clip and the third clip when the first tubular member extends along the second base between the first pair of fingers and the third pair of fingers and (2) a second tubular member by the second clip when the second tubular member extends between the second pair of fingers along the first tubular member and the first base or the third base such that the second base extends between the first tubular member and the second tubular member.

There may be a device, comprising: a bracket including a first clip, a second clip, and a third clip, wherein the second clip spans between the first clip and the third clip to enable the bracket to be capable of simultaneously engaging a first tubular member by the first clip and the third clip and a second tubular member by the second clip as the first tubular member extends along the second tubular member.

DETAILED DESCRIPTION

Generally, this disclosure enables various brackets and methods of manufacture and use thereof. These brackets address the various drawbacks noted above. For example, a bracket may have a first clip, a second clip, and a third clip, where the second clip spans between the first clip and the third clip to enable the bracket to be capable of simultaneously engaging (e.g., holding, clamping) a first tubular member (e.g., a tube, a socket, a bulb) by the first clip and the third clip and a second tubular member (e.g., a tube, a socket, a bulb) by the second clip as the first tubular member extends along the second tubular member. However, note that this disclosure may be embodied in many different forms and should not be construed as necessarily being limited to various embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected," or "coupled" to another element, then the element can be directly on, connected, or coupled to another element or intervening elements can be present, including indirect or direct variants. In contrast, when an element is referred to as being "directly connected" or "directly coupled" to another element, then there are no intervening elements present.

Various singular forms "a," "an" and "the" are intended to include various plural forms (e.g., two, three, four, five, six, seven, eight, nine, ten, tens, hundreds, thousands) as well, unless specific context clearly indicates otherwise.

Various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, a term "or others," "combination", "combinatory," or "combinations thereof" or another conceptually similar terminology refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisans understand that typically there is no limit on number of items or terms in any combination, unless otherwise contextually apparent.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense, unless expressly so defined herein.

Relative terms, such as "below," "lower," "above," and "upper," can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

Although the terms first, second, can be used herein to describe various elements, components, regions, layers, or sections, these elements, components, regions, layers, or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in or with various other example embodiments. Also, different aspects or elements of example embodiments, as disclosed herein, can be combined and sub-combined in a similar manner as well. Further, some example embodiments, whether individually or collectively, can be components of a larger system, wherein other procedures can take precedence over or otherwise modify their application. Additionally, a number of steps can be required before, after, or concurrently with example embodiments, as disclosed herein. Note that any or all methods or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

Any or all elements, as disclosed herein, can include metal (e.g., aluminum, iron, copper, titanium, gold, silver, rare-earth), alloy (e.g., stainless steel, brass, bronze) rubber, wood, plastic, glass, ceramic, stone, clay, or any other suitable material.

Any or all elements, as disclosed herein, can be formed from a same, structurally continuous piece, such as being unitary or monolithic, or be separately manufactured or connected, such as being an assembly or modules.

Any or all elements, as disclosed herein, can be manufactured via any manufacturing processes, whether additive manufacturing, subtractive manufacturing, or other any other suitable types of manufacturing. For example, some manufacturing processes include three dimensional (3D) printing, laser cutting, computer numerical control (CNC) routing, milling, pressing, stamping, vacuum forming, hydroforming, injection molding, lithography, chiseling, cutting, or any other suitable manufacturing process.

Hereby, all issued patents, published patent applications, and non-patent publications that are mentioned or referred to in this specification are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

Figure 11:
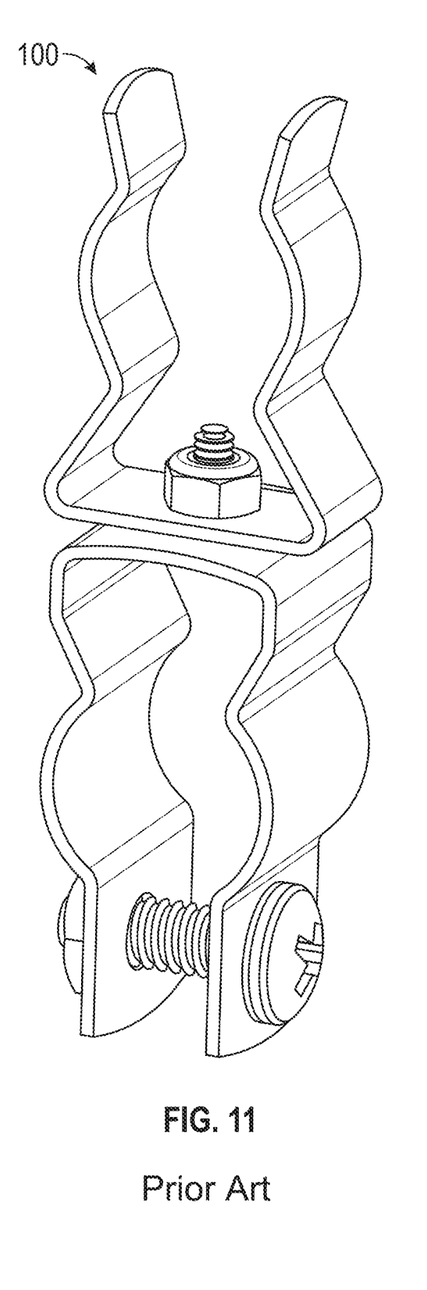
FIG. 11 shows the assembly of FIG. 1
Figure 12:
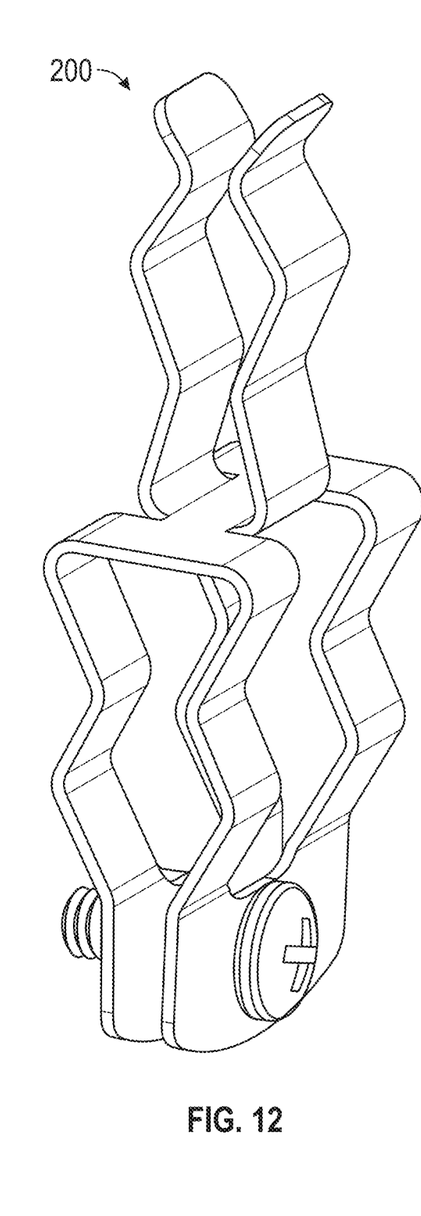
FIG. 12 shows the bracket of FIG. 3 to FIG. 10 according to this disclosure.
Figure 13:
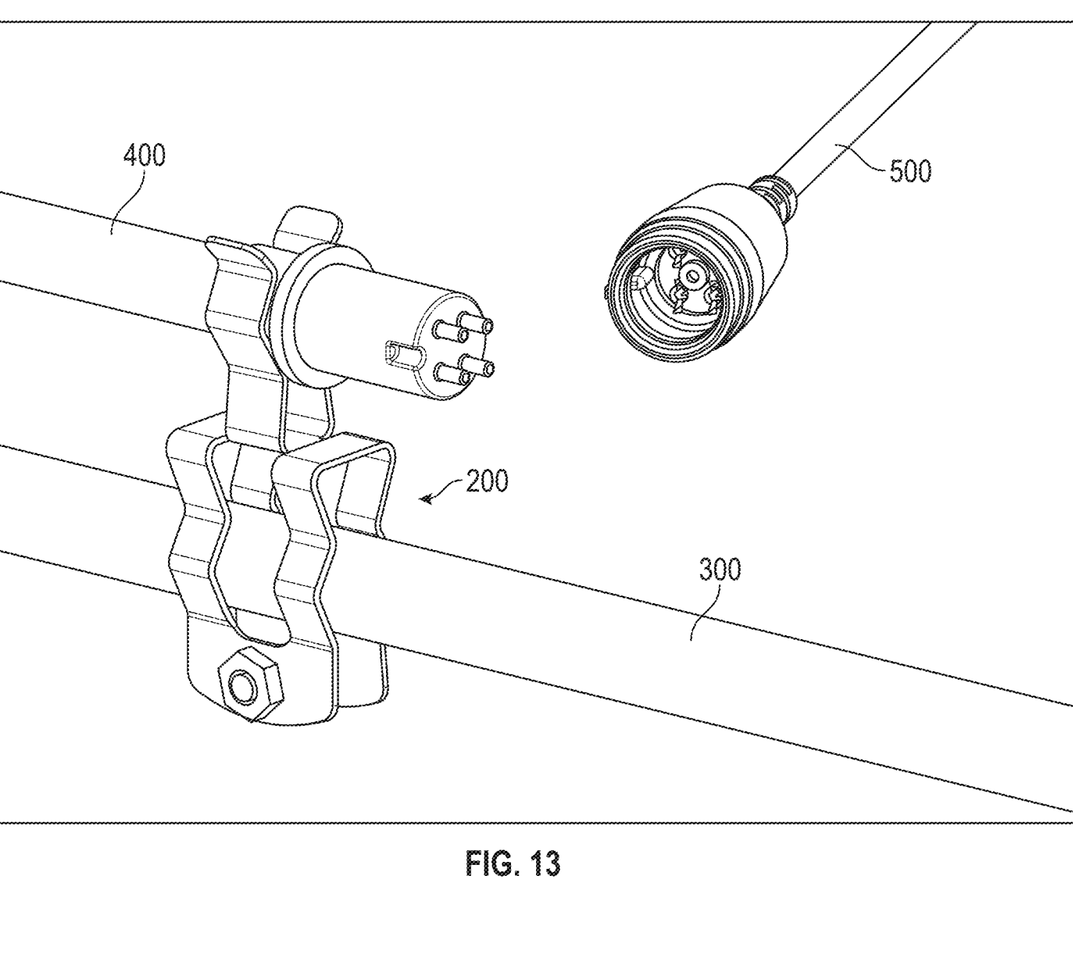
FIG. 13 shows an embodiment of a bracket of FIG. 3 to FIG. 10 simultaneously engaging a first tubular member (e.g., a tube) and a second tubular member (e.g., a bulb)
Figure 14A:
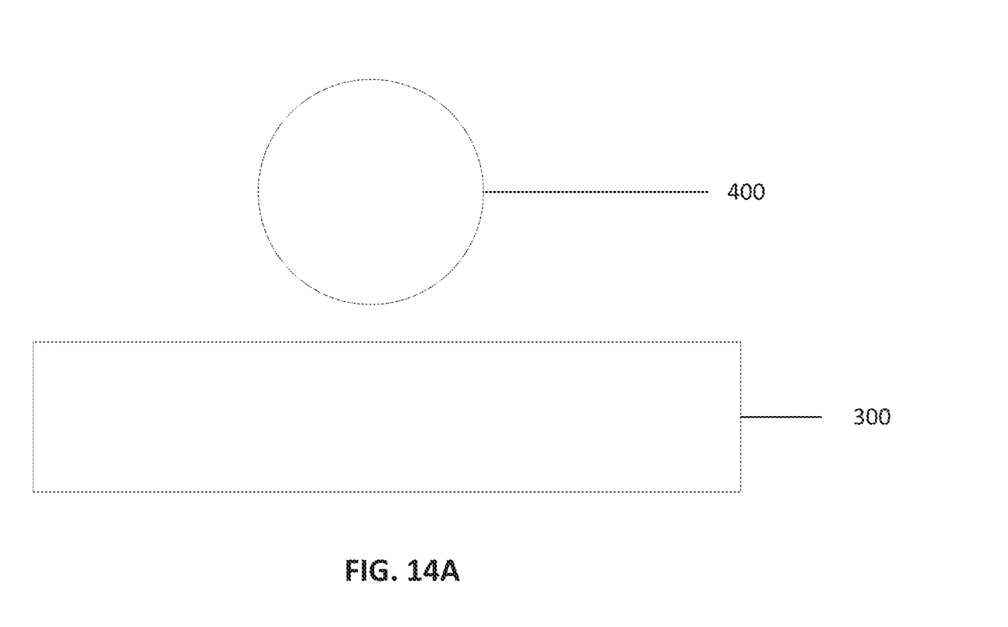
FIG. 14A shows an embodiment of the first tubular member being not parallel to the second tubular member.
Figure 14B:
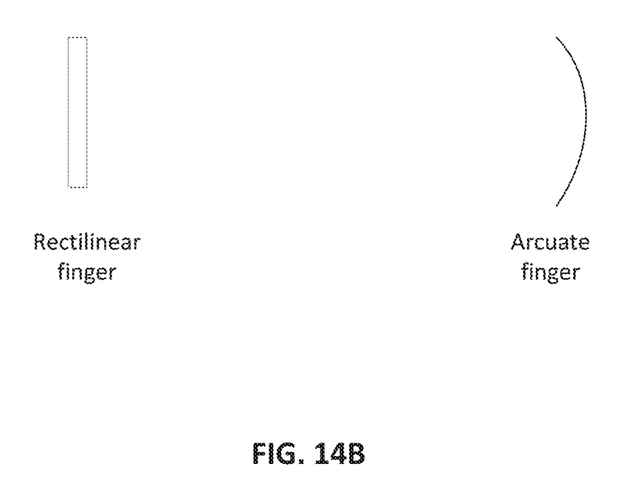
FIG. 14B shows an embodiment of a rectilinear finger and an embodiment of an arcuate finger, each according to this disclosure.

FIG. 3 to FIG. 10 show an embodiment of a bracket according to this disclosure. FIG. 11 shows the bracket of FIG. 1 and FIG. 12 shows the bracket of FIG. 3 to FIG. 10 according to this disclosure. FIG. 13 shows an embodiment of a bracket of FIG. 3 to FIG. 10 simultaneously engaging a first tubular member (e.g., a tube) and a second tubular member (e.g., a bulb), FIG. 14A shows an embodiment of the first tubular member being not parallel to the second tubular member, and FIG. 14B shows an embodiment of a rectilinear finger and an embodiment of an arcuate finger, each according to this disclosure.

In particular, a bracket 200 includes a first clip 202, a second clip 204, and a third clip 206. The second clip 204 spans between the first clip 202 and the third clip 206. Although the first clip 202 and the third clip 206 appear to be similarly configured (e.g., structured, constituted, oriented, angled), this is not required and the first clip 202 may be configured in one manner and the third clip 206 may be configured in another manner. Likewise, note that any of the first clip 202, the second clip 204, or the third clip 206 may include or be a clamp.

Each of the first clip 202, the second clip 204, and the third clip 206 includes a respective base 200B and a respective pair of fingers 200F, where at least one finger of the pair of fingers 200F of the first clip 202, the second clip 204, or the third clip 206 may be longitudinally rectilinear, non-rectilinear, zigzag, arcuate, concave, convex, or another suitable shape, and where each finger has a tip portion at which such longitudinal extension terminates. As such, each respective base 200B has a top side, a bottom side, and a set of sidewalls opposing each other and spanning between the top side and the bottom side, to allow that base 200B to be internally solid, although the base 200B can be internally hollow. Although each base 200B is shaped to be substantially rectangular, this form of shaping is not required. For example, at least one base 200B may be substantially square, oval, circular, triangular, polygonal, pentagonal, hexagonal, semi of any of foregoing, or any other suitable shape. Each of the top side, the bottom side, and the pair of sidewalls is flat and smooth, but does not need to be. For example, at least one of the top side, the bottom side, or one sidewall of the pair of sidewalls may be concave, convex, sinusoidal, rough, perforated, knurled, textured, or any other suitable configuration.

As shown in FIGS. 3 and 5-8, the top side of the base 200B of the first clip 202 and the top side of the base 200B of the third clip 206 are level and coplanar with each other (e.g., along a horizontal plane, a X-plane on a Cartesian XYZ coordinate system), but do not need to be. For example, the top side of the base 200B of the first clip 202 and the top side of the base 200B of the third clip 206 may be inclined, whether toward or away from each other or laterally, or raised differently from each other (e.g., along a vertical plane, a Y-plane on a Cartesian XYZ coordinate system). The top side of the base 200B of the first clip 202 and the top side of the base 200B of the third clip 206 are level and coplanar with the top side of the base 200B of the second clip 204 (e.g., along a horizontal plane, a X-plane on a Cartesian XYZ coordinate system) to be flush therewith, but do not need to be. For example, the top side of the base 200B of the first clip 202 or the top side of the base 200B of the third clip 206 may be angled between about 0 degrees and about 90 degrees relative to the top side of the base 200B of the second clip 204.

The base 200B of the second clip 204 spans (e.g., bridges) between the base 200B of the first clip 202 and the base 200B of the third clip 206, which may respectively be sidewall-to-sidewall. For example, the base 200B of the second clip 204 may spans between the base 200B of the first clip 202 and the base 200B of the third clip 206 to present as an H-shape when viewed from above. The base 200B of the second clip 204 is monolithic with the base 200B of the first clip 202 and the base 200B of the third clip 206, but that configuration is not necessary. For example, the base 200B of the second clip 204 can be monolithic with the base 200B of the first clip 202 or the base 200B of the third clip 206. For example, the base 200B of the second clip 204 can be assembled (e.g., fastened, mated, adhered, magnetized, interlocked) with the base 200B of the first clip 202 or the base 200B of the third clip 206.

As shown in FIGS. 3 and 5-8, the pair of fingers 200F of the first clip 202 may extend from the bottom side of the base 200B of the first clip 202 and the pair of fingers 200F of the third clip 206 may extend from the bottom side of the base 200B of the third clip 206, along a first plane (e.g., a vertical plane, a Y-plane on a Cartesian XYZ coordinate system) longitudinally extending through the base 200B of the second clip 204 toward a second plane (e.g., a horizontal plane, an X-plane on a Cartesian XYZ coordinate system) longitudinally extending along the base 200B of the second clip 204 and the base 200B of the first clip 202 or the base 200B of the third clip 206. Each finger in the pair of fingers 200F of the first clip 202 and the pair of fingers 200F of the third clip 206 may extend along (e.g., parallel) the first plane extending through the base 200B of the second clip 204 towards the second plane, although that is not required.

The first plane may be rectilinear and perpendicular to the base 200B of the second clip 204, such that the pair of fingers 200F of the first clip 202 avoids extending past the first plane and the pair of fingers 200F of the third clip 206 avoids extending past the first plane, although this is not required in either instances. For example, at least one finger of the pair of fingers 200F of the first clip 202 or the third clip 206 may extend past the first plane. If the base 200B of the second clip 205 has a center, then the first plane may extend through the center.

The second plane may be rectilinear and parallel to the base 200B of the second clip 204 and the base 200B of the first clip 202 or the base 200B of the third clip 206, such that the pair of fingers 200F of the first clip 202 extends towards the second plane and the pair of fingers 200F of the third clip 206 extends towards the second plane, although this is not required in either instances. For example, at least one finger of the pair of fingers 200F of the first clip 202 or the third clip 206 may extend along the second plane, which may be parallel thereto. The second plane may intersect the first plane. For example, the second plane may be perpendicular to the first plane, although acute or obtuse angling is possible. For example, the first plane and the second plane may form an inverted T-shape, where the first plane is vertical and the second plane is horizontal.

As shown in FIGS. 3 and 5-8, the pair of fingers 200F of the first clip 202 extends from the bottom side of the base 200B of the first clip 202, away from that bottom side such that the pair of fingers 200F of the first clip 202 are spaced apart from each other and oppose each other (e.g., face each other) for a first tubular member 300 (e.g., a tube, a socket, a bulb) to be able to extend therebetween, as shown in FIG. 13. For example, the first tubular member 300 can be a UV bulb, an electrical socket, a tube, or another tubular form factor, as shown in FIG. 13, whether uniform in cross-section or longitudinal extension or not.

Although the pair of fingers 200F of the first clip 202 longitudinally extend in a zigzag manner while extending from the bottom side of the base 200B of the first clip 202, this is not required. For example, the pair of fingers 200F of the first clip 202 can longitudinally extend in a non-zigzag manner (e.g., arcuate, sinusoidal, rectilinear). Likewise, although each finger of the pair of fingers 200F in the first clip 202 appears to complement or mirror its opposing finger, this is not required. For example, one finger in the pair of fingers 200F of the first clip 202 can longitudinally extend in the zigzag manner and another finger in the pair of fingers 200F of the first clip 202 can longitudinally extend in the non-zigzag manner. Note that this differencing is not only applicable to longitudinal extension of fingers in the pair of fingers 200F of the first clip 202, but may be applicable to other parameters (e.g., width, thickness) characteristics, materials, structure, orientations, shapes, sizes, degrees of stiffness or flexibility or resiliency, or other suitable attributes. For example, one finger in the pair of fingers 200F of the first clip 202 can be more stiff or resilient than another finger in the pair of fingers 200F of the first clip 202. Note that the pair of fingers 200F in the first clip 202 may be shaped as in the first clip or the second clip in the assembly 100 shown in FIG. 1 and FIG. 2 or any finger of the pair of fingers 200F of the second clip 204, regardless of how a respective tip portion of a respective finger is oriented (e.g., perpendicular, acute, obtuse) relative to a respective base 200B (e.g., the top side or the bottom side). For example, some or each finger in the pair of fingers 200F of the first clip 202 or the pair of fingers 200F of the third clip 206 may have a different longitudinal extension (or another characteristic) from some or each finger of the pair of fingers 200F in the second clip 204, where the different longitudinal extension can be length, shape, size, or another property.

The base 200B of the first clip 202 is monolithic with the pair of fingers 200F of the first clip 202, although this is not required. For example, the base 200B of the first clip 202 can be assembled (e.g., fastening, mating, adhering, magnetizing, interlocking) with the pair of fingers 200F of the first clip 202.

The pair of fingers 200F of the first clip 202 extend from the bottom side of the base 200B of the first clip 202 to allow that pair of fingers 200F to be sufficiently resilient, bendable, flexible, or shape-memory relative to that bottom side of the base 200B of the first clip 202 to accommodate the first tubular member to be inserted (e.g., manually, automatically) between that pair of fingers 200B to engage (e.g., hold) the first tubular member by inward force or pressure toward each other, although this is not required. For example, at least one finger of the pair of fingers 200F of the first clip 202 may be rigid (e.g., unable to be manually bent, flexed, or moved).

Likewise, as shown in FIGS. 3 and 5-8, the pair of fingers 200F of the third clip 206 extends from the bottom side of the base 200B of the third clip 206, away from that bottom side such that the pair of fingers 200F of the third clip 206 are spaced apart from each other and oppose each other (e.g., face each other) for a second tubular member 300 (e.g., a tube, a socket, a bulb) to be able to extend therebetween, as shown in FIG. 13. For example, the second tubular member 300 can be a UV bulb, an electrical socket, a tube, or another tubular form factor, as shown in FIG. 13.

Although the pair of fingers 200F of the third clip 206 longitudinally extend in a zigzag manner while extending from the bottom side of the base 200B of the third clip 206, this is not required. For example, the pair of fingers 200F of the third clip 206 can longitudinally extend in a non-zigzag manner (e.g., arcuate, sinusoidal, rectilinear). Likewise, although each finger of the pair of fingers 200F in the third clip 206 appears to complement or mirror its opposing finger, this is not required. For example, one finger in the pair of fingers 200F of the third clip 206 can longitudinally extend in the zigzag manner and another finger in the pair of fingers 200F of the third clip 206 can longitudinally extend in the non-zigzag manner. Note that this differencing is not only applicable to longitudinal extension of fingers in the pair of fingers 200F of the third clip 206, but may be applicable to other parameters (e.g., width, thickness), characteristics, materials, structure, orientations, shapes, sizes, degrees of stiffness or flexibility or resiliency, or other suitable attributes. For example, one finger in the pair of fingers 200F of the third clip 206 can be more stiff or resilient than another finger in the pair of fingers 200F of the third clip 206. Note that the pair of fingers 200F in the third clip 206 may be shaped as in the first clip or the second clip in the assembly 100 shown in FIG. 1 and FIG. 2 or any finger of the pair of fingers 200F of the second clip 204, regardless of how a respective tip portion of a respective finger is oriented (e.g., perpendicular, acute, obtuse) relative to a respective base 200B (e.g., the top side or the bottom side).

The base 200B of the third clip 206 is monolithic with the pair of fingers 200F of the third clip 206, although this is not required. For example, the base 200B of the third clip 206 can be assembled (e.g., fastening, mating, adhering, magnetizing, interlocking) with the pair of fingers 200F of the third clip 206.

The pair of fingers 200F of the third clip 206 extend from the bottom side of the base 200B of the third clip 206 to allow that pair of fingers 200F to be sufficiently resilient, bendable, flexible, or shape-memory relative to that bottom side of the base 200B of the third clip 206 to accommodate the second tubular member to be inserted (e.g., manually, automatically) between that pair of fingers 200B to engage (e.g., hold) the second tubular member by inward force or pressure toward each other, although this is not required. For example, at least one finger of the pair of fingers 200F of the third clip 206 may be rigid (e.g., unable to be manually bent, flexed, or moved).

As shown in FIG. 13, the first tubular member 300 and the second tubular member 300 can be a single tubular member 300 longitudinally (e.g., rectilinearly, arcuately, sinusoidally) extending along the bottom side of the base 200B of the second clip 204 between the pair of fingers 200F of the first clip 202 and the pair of fingers 200F of the third clip 206. However, this is not required. For example, the first tubular member 300 and the second tubular member 300 can be separate and distinct from each other and the bracket 200 can engage (e.g., hold) the first tubular member 300 between the pair of fingers 200F extending from the base 200B of the first clip 202 and the second tubular member 300 between the pair of fingers 200F extending from the base 200B of the third clip 206, whether the first tubular member 300 and the second tubular member 300 are terminally coaligned with each other (e.g., end portions opposing or facing each other) or not terminally coaligned with each other (e.g., end portions not opposing or facing each other), as further explained below in context of FIG. 13. The first tubular member 300 and the second tubular member 300 can be of a single form factor or type or can be of different form factors or types.

As shown in FIGS. 3 and 5-8, the pair of fingers 200F of the second clip 204 extends from the top side of the base 200B of the second clip 204, along the first plane longitudinally extending through the base 200B of the second clip 204 and away from the second plane longitudinally extending along the base 200B of the second clip 204 and the base 200B of the first clip 202 or the base 200B of the third clip 206. Therefore, while the pair of fingers 200F of the second clip 204 extends away from the second plane, each of the pair of fingers 200F of the first clip 202 and the pair of fingers 200F of the third clip 206 extend toward the second plane.

As explained above, the first plane may be rectilinear and perpendicular to the base 200B of the second clip 204, such that the pair of fingers 200F of the second clip 204 extends along the first plane, away from the top side of the base 200B of the second clip 204, and the pair of fingers 200F of the second clip 204 can oppose each other (e.g., facing each other). When the base 200B of the second clip 204 has the center, then the first plane may extend through the center. For example, the first plane may extend between the pair of fingers 200F of the second clip 204. The second plane may be rectilinear and parallel to the base 200B of the second clip 204 and the base 200B of the first clip 202 or the base 200B of the third clip 206, such that the pair of fingers 200F of the second clip 204 extends away from the second plane. The second plane may intersect the first plane. For example, the second plane may be perpendicular to the first plane, although acute or obtuse angling is possible. For example, the first plane and the second plane may form an inverted T-shape, where the first plane is vertical and the second plane is horizontal.

As shown in FIGS. 3 and 5-8, the pair of fingers 200F of the second clip 204 extends from the top side of the base 200B of the second clip 204, away from that top side such that the pair of fingers 200F of the second clip 204 are spaced apart from each other and oppose each other (e.g., face each other) for a third tubular member 400 (e.g., a tube, a socket, a bulb) to be able to extend therebetween, as shown in FIG. 13. For example, the third tubular member 400 can be a UV bulb, an electrical socket, a tube, or another tubular form factor, as shown in FIG. 13, whether uniform in cross-section or longitudinal extension or not. For example, the single tubular member 300 can be embodied as the third tubular member 400 (e.g., a bulb) being joined (e.g., connected, plugged) with a fourth tubular member 500 (e.g., a socket), although the tubular member 500 can take other forms (e.g., a socket, a tube).

Although the pair of fingers 200F of the third clip 206 longitudinally extend in a zigzag manner while extending from the bottom side of the base 200B of the second clip 204, this is not required. For example, the pair of fingers 200F of the second clip 204 can longitudinally extend in a non-zigzag manner (e.g., arcuate, sinusoidal, rectilinear). Likewise, although each finger of the pair of fingers 200F in the second clip 204 appears to complement or mirror its opposing finger, this is not required. For example, one finger in the pair of fingers 200F of the second clip 204 can longitudinally extend in the zigzag manner and another finger in the pair of fingers 200F of the second clip 204 can longitudinally extend in the non-zigzag manner. Note that this differencing is not only applicable to longitudinal extension of fingers in the pair of fingers 200F of the second clip 204, but may be applicable to other parameters (e.g., width, thickness), characteristics, materials, structure, orientations, shapes, sizes, degrees of stiffness or flexibility or resiliency, or other suitable attributes. For example, one finger in the pair of fingers 200F of the second clip 204 can be more stiff or resilient than another finger in the pair of fingers 200F of the second clip 204. Note that the pair of fingers 200F in the second clip 204 may be shaped as in the first clip or the second clip in the assembly 100 shown in FIG. 1 and FIG. 2 or any finger of the pair of fingers 200F of the first clip 202 or the third clip 206, regardless of how a respective tip portion of a respective finger is oriented (e.g., perpendicular, acute, obtuse) relative to a respective base 200B (e.g., the top side or the bottom side).

The base 200B of the second clip 204 is monolithic with the pair of fingers 200F of the second clip 204, although this is not required. For example, the base 200B of the second clip 204 can be assembled (e.g., fastening, mating, adhering, magnetizing, interlocking) with the pair of fingers 200F of the second clip 204.

The pair of fingers 200F of the second clip 204 extend from the top side of the base 200B of the second clip 204 to allow that pair of fingers 200F to be sufficiently resilient, bendable, flexible, or shape-memory relative to that top side of the base 200B of the second clip 204 to accommodate the third tubular member 400 to be inserted (e.g., manually, automatically) between that pair of fingers 200B to engage (e.g., hold) the third tubular member 400 by inward force toward each other, although this is not required. For example, at least one finger of the pair of fingers 200F of the second clip 204 may be rigid (e.g., unable to be manually bent, flexed, or moved).

As shown in FIG. 13, the third tubular member 400 and each of the first tubular member 300 and the second member 300 are separate and distinct from each other. However, this is not required and the third tubular member 400 and the first tubular member 300 or the second tubular member 300 can be a single tubular member 300 or 400. For example, the third tubular member 400 and the first tubular member 300 or the second tubular member 300 may be arcuate or U-shaped while being held by the first clip 202, the second clip 204, and the third clip 206, via respective pair of fingers 200F.

As shown in FIGS. 3 and 5-8, the bracket 200 includes a first plate 208 and a second plate 210, each of which is rigid, flat, and solid, but can be flexible, resilient, bendable, shape-memory, non-flat (e.g., concave, convex, sinusoidal), hollow, or perforated. The first plate 208 spans between one finger of the pair of fingers 200F of the first clip 202 and one finger of the pair of fingers 200F of the third clip 206, while the second plate 210 spans between one finger of the pair of fingers 200F of the first clip 202 and one finger of the pair of fingers 200F of the third clip 206, such that the first plate 208 and the second plate 210 oppose (e.g., face) each other, which may occur when the first tubular member 300 is engaged (e.g., held, clamped) by the first clip 202 (respectfully extending between the pair of fingers 200F) and the third clip 206 (respectfully extending between the pair of fingers 200F), although that is not required and such opposition can occur when the first tubular member 300 is not extending between the pair of fingers 200F of the first clip 202 or the pair of fingers 200F of the third clip 206. Since the pair of fingers 200F of the first clip 202 and the pair of fingers 200F of the third clip 206 may be resilient, bendable, flexible, or shape-memory respectfully relative to that bottom side of the base 200B of the first clip 202 and the bottom side of the base 200B of the third clip 206, the first plate 208 and the second plate 210 may be spaced apart from each other at a distance that is adjustable based on the pair of fingers of the first clip 202 moving with respect to each other or the pair of fingers of the third clip 206 moving with respect to each other, whether simultaneously or not. Although each of the first plate 208 and the second plate 210 extend along (e.g., parallel) each of the base 200B of the first clip 202, the base 200B of the second clip 204, and the base 200B of the third clip 206, this is not required, and non-parallel extension is possible.

Each of the first plate 208 and the second plate 210 defines a bore, whether smooth or threaded, structured to receive a shank of a fastener 212 (e.g., a bolt, a screw), although this is not required and the first plate 208 or the second plate 210 may not have the bore. For each of the first plate 208 and the second plate 210, the bore may be positioned such that the base of the second clip 204 opposes the shank between the first plate 208 and the second plate 210 when the shank spans between the first plate 208 and the second plate 208. For each of the first plate 208 and the second plate 210, the bore may be positioned such that the shank can span between the first plate 208 and the second plate 210 and there is an area between the bottom side of the base 200B of the second clip 204 and the shank through which the first tubular member or the second tubular member can extend when being engaged by the first clip 202 (the pair of fingers 200F) or the third clip 206 (the pair of fingers 200F). When the fastener 212 is a bolt, then a nut 214 may thread onto the fastener 212 such that the first plate 208 or the second plate 210, depending on how the nut 214 is threaded, contacts or engages the nut 214 to control how spaced apart the first plate 208 and the second plate 210 are from each other based on the nut 214 being more fastened or less fastened on the fastener 212. This may allow for the first clip 202 (the pair of fingers 200F) and the third clip 206 (the pair of fingers 200F) to better or worse or more or less firmly grasp onto or apply force or squeeze the first tubular member or the second tubular member engaged by the first clip 202 (the pair of fingers 200F) or the third clip 206 (the pair of fingers 200F). Although the first plate 208 and the second plate 210 is level with each other, this is not required and the first plate 208 may be higher or lower relative to the second plate 210 along the second plane. For example, when not level, the shank of the fastener 212 may be inclined. Note that the nut 214 may be omitted.

Figures 3, 4:
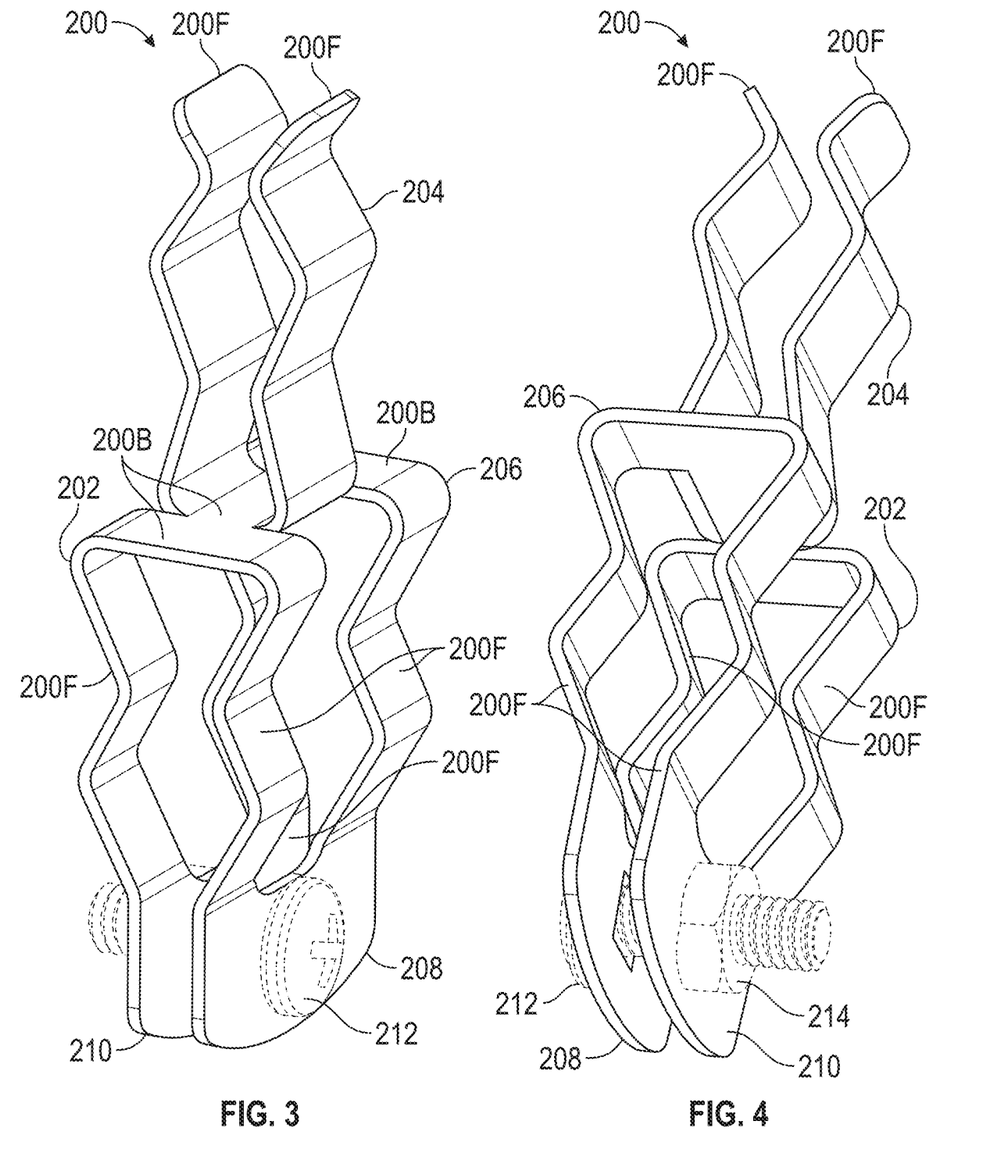
FIG. 3 to FIG. 10 show an embodiment of a bracket according to this disclosure.
Figure 5:
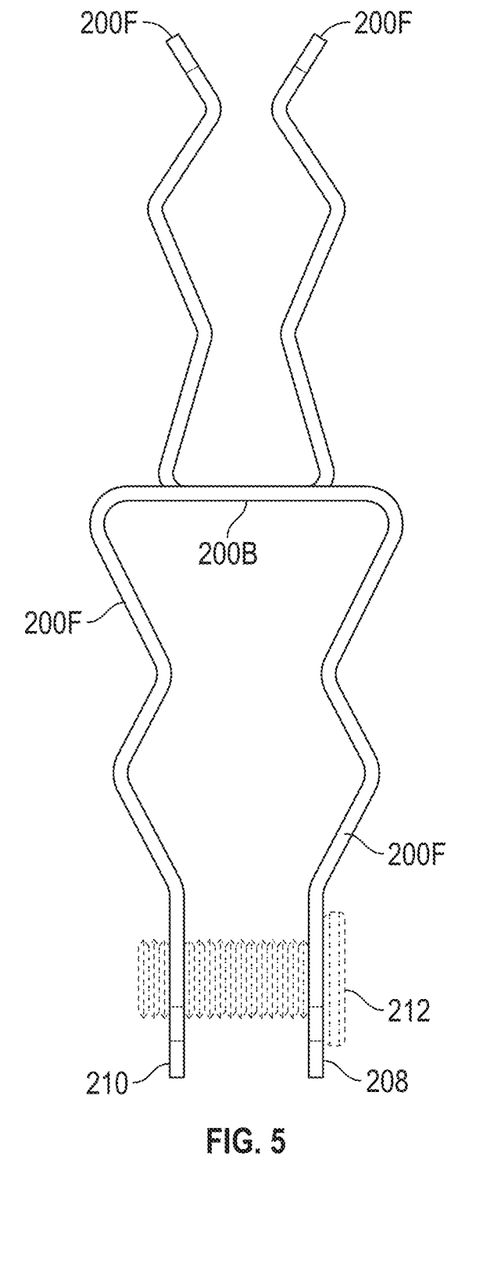
Figure 6:
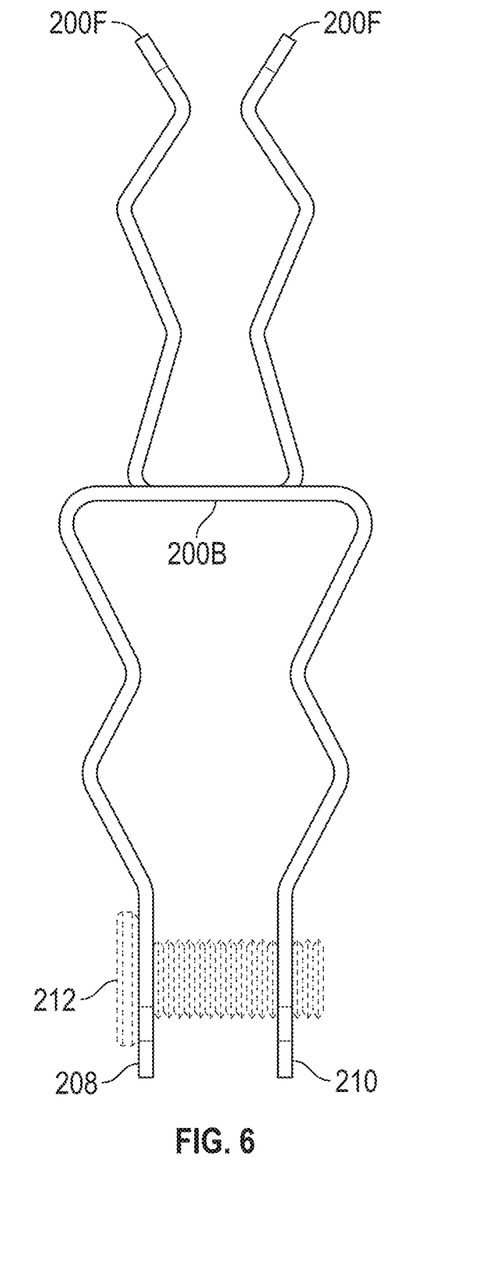
Figure 7:
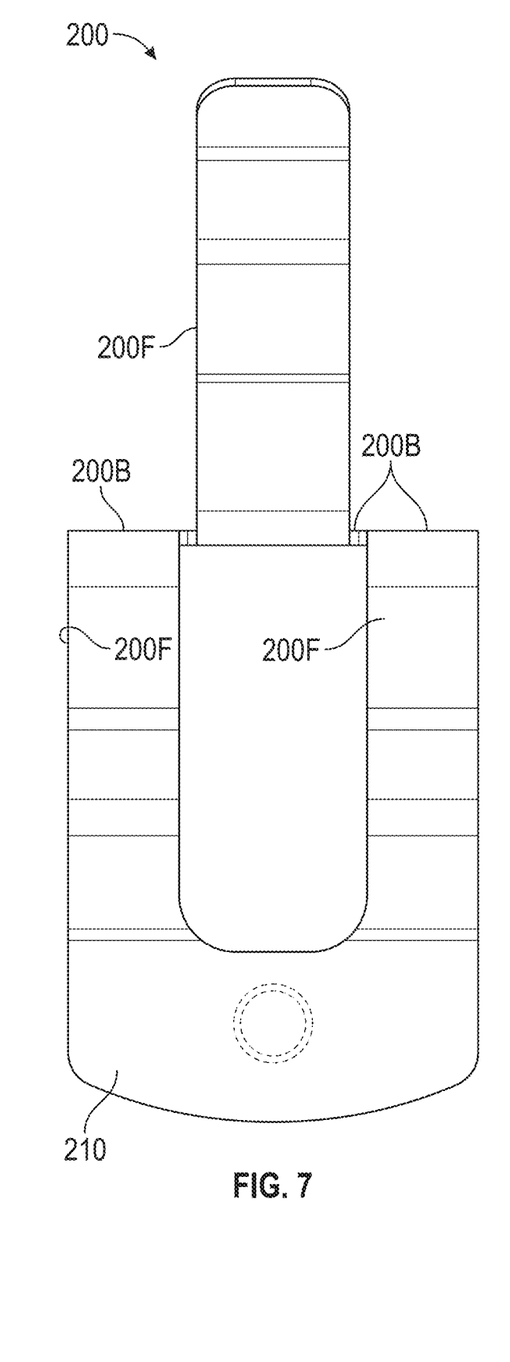
Figure 8:
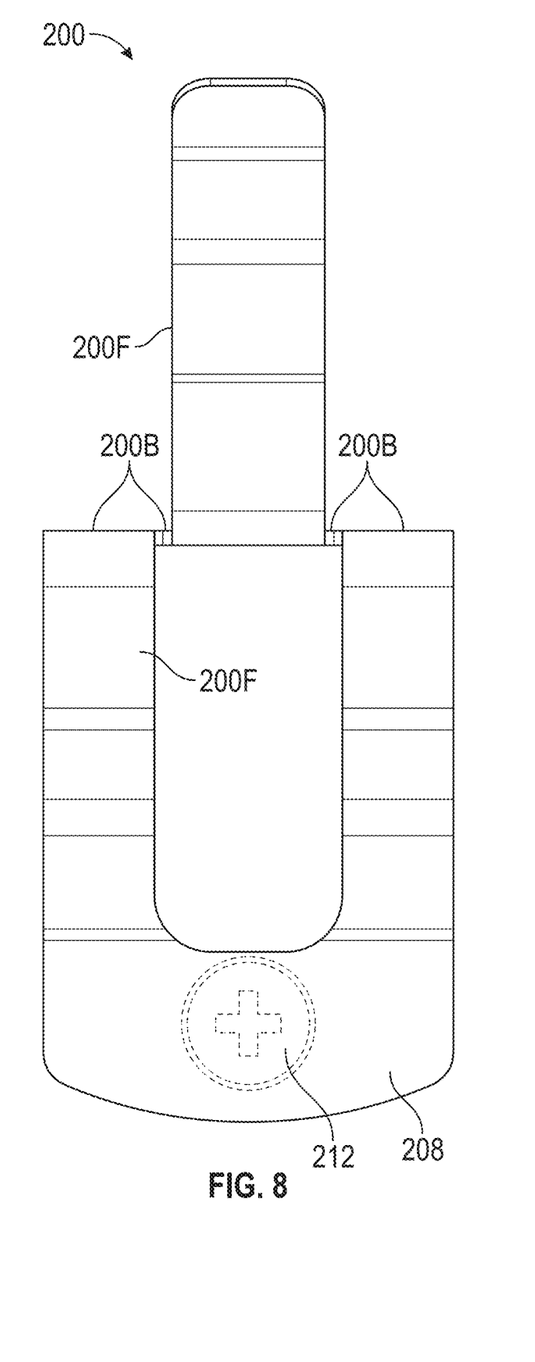
Figure 9:
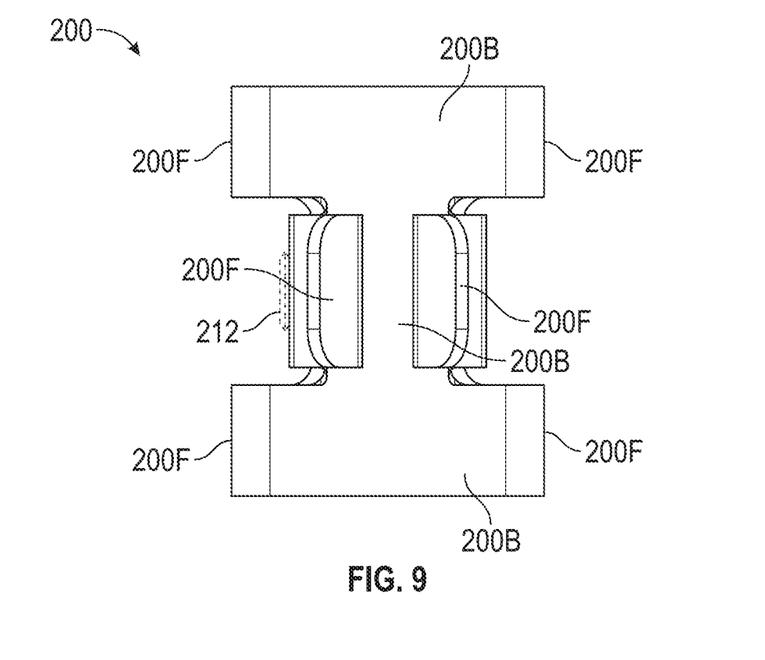
Figure 10:
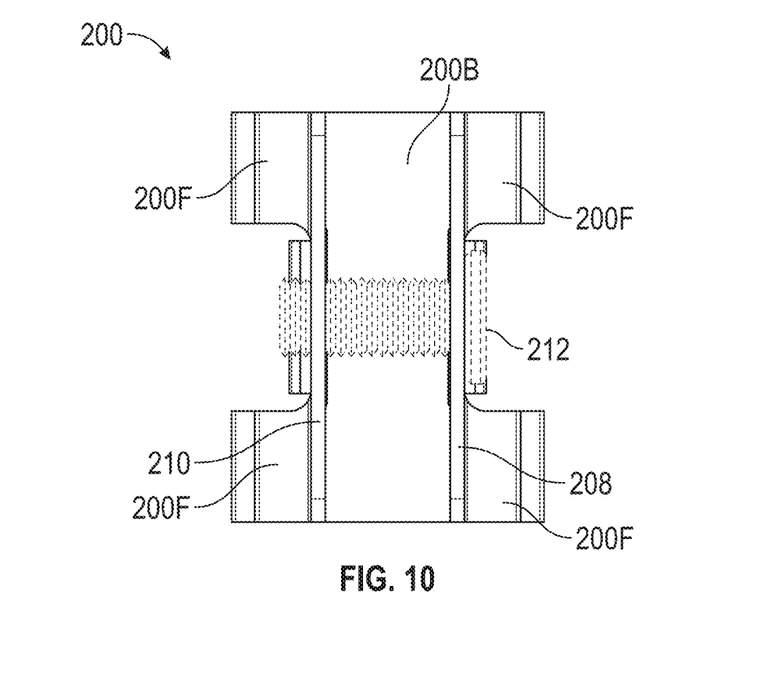

As shown in FIGS. 3 and 7-8, along the first plate 208 or the base 200B of the second clip 204 or one finger of the pair of fingers 200F of the second clip 204, the bracket 200 may be configured to have one finger of the pair of fingers 200B of the first clip 202 and one finger of the pair of fingers 200B of the third clip 206 to be spaced apart to each other to enable a first window (e.g., an open space) therebetween into the area underneath the bottom side of the base 200B of the second clip 204. Likewise, along the second plate 208 or the base 200B of the second clip 204 or one finger of the pair of fingers 200F of the second clip 204, the bracket 200 may be configured to have one finger of the pair of fingers 200B of the first clip 202 and one finger of the pair of fingers 200B of the third clip 206 to be spaced apart to each other to enable a second window (e.g., an open space) therebetween into the area underneath the bottom side of the base 200B of the second clip 204. The first window opposes (e.g., faces) the second window, but that is not required and the first window may laterally be offset to the second window. The first window and the second window may be further respectively defined by the first plate 208 and the second plate 210, although that is not required, since the first window or the second window may still respectively exist if the first plate 208 or the second plate 210 is omitted. The first window or the second window may or may not be longitudinally longer than the base 200B of the second clip 204.

As shown in FIG. 13, the first tubular member 300 and the second tubular member 300 are a single tubular member 300, where the first tubular member 300 is parallel to the third tubular member 400, or vice versa. However, note that this form of orientation is not required and the first tubular member 300 may be non-parallel to the third tubular member 400. For example, the first tubular member 300 may longitudinally extend along one plane and the third tubular member 400 may longitudinally extend along another plane intersecting the one plane, or vice versa, where such intersecting may be at an angle between about 5 degrees and about 175 degrees, which may be at the angle being between about 85 degrees and 95 degrees, which may include the angle of about 90 degrees. This may be useful when the third tubular 400 member is longitudinally acute, obtuse, or perpendicular to the first tubular member 300 (e.g., at a T-shape). Regardless, the bracket 200 is capable of simultaneously engaging (e.g., holding, clamping) (1) the first tubular member 300 by the first clip 202 and the third clip 206 when the first tubular member 300 extends along the base 200B of the second clip 204 between the pair of fingers 200F of the first clip 202 and the pair of fingers 200F of the third clip 206 and (2) the third tubular member 400 by the second clip 204 when the third tubular member 400 extends between the pair of fingers 200F of the second clip 204 along the first tubular member 300 and the base 200B of the first clip 202 or the base 200B of the third clip 206 such that the base 200B of the second clip 204 extends between the first tubular member 300 and the third tubular member 400. Note that the bracket 200 does not need to engage with the first tubular member 300 and the third tubular member 400. For example, the bracket 200 can engage with the first tubular member 300 or the third tubular member 400 or both or neither.

The nut 214 can be threaded onto the fastener 212 such that the first plate 208 or the second plate 210, depending on how the nut 214 is threaded, contacts or engages the nut 214 to control how spaced apart the first plate 208 and the second plate 210 are from each other based on the nut 214 being more fastened or less fastened on the fastener 212, which may enable the distance between the first plate 208 and the second plate 210 to be adjustable based on the pair of fingers of the first clip 202 moving with respect to each other or the pair of fingers of the third clip 206 moving with respect to each other, whether simultaneously or not. This may allow for the first clip 202 (the pair of fingers 200F) and the third clip 206 (the pair of fingers 200F) to better or worse or more or less firmly grasp onto or apply force or squeeze the first tubular member or the second tubular member engaged by the first clip 202 (the pair of fingers 200F) or the third clip 206 (the pair of fingers 200F). Each of the first plate 208 and the second plate 210 may define the bore structured to receive the shank of the fastener 212 such that the nut 214 can be threaded onto the shank to control how spaced apart are the first plate 208 and the second plate 210 when the second plate 210 extends between the first plate 208 and the nut 214.

The bracket 200 can be used many environments. For example, as shown in FIG. 13, the first tubular member 300 or the third tubular member 400 extend may extend within an air handling unit when the first tubular member 300 is held by the first clip 202 (the pair of fingers 200F) and the third clip 206 (the pair of fingers 200F) or the third tubular member 300 is held by the second clip 204 (the pair of fingers 200F). For example, the air handling unit can be an indoor unit of a mini-split air conditioner, but that is not required. For example, a designer, a manufacturer, or a supplier cause the bracket 200 to be accessed to simultaneously engage (e.g., holding, clamping) the first tubular member 300 by the first clip 202 and the third clip 206 and the third tubular member 300 by the second clip 204, as the first tubular member 300 extends along the third tubular member 400, regardless of environment.

The bracket 200 can be packaged, whether alone or with any others, whether disclosed herein or not, in a kit, to be sent by mail or courier. For example, the kit can include a package (e.g. plastic bag, sealed bag, storage container, cardboard box, transport package, consumer package, bubble wrap, foam blanket, garment blanket, can, shrink-wrap, molded pulp, blister pack). For example, the package can include a cuboid box, a shipping box, an intermodal container, or others. The package can include a single device or a set of devices, as disclosed herein or not disclosed herein. For example, the kit can include the bracket 200 and any tubular members, as disclosed herein. Further, whether or not included in the kit, there may be a set of instructions (e.g., a diagram, a photo, a user guide, a manual, a paper pamphlet, a sticker, a webpage, a video, an article, an augmented reality wizard) instructing a user on how to use bracket 200 (e.g., how to mount, unmount, engage, clamp, hold, fasten, maintain, clean, store) or other suitable instructions relating to usage of the bracket 200.

Although various embodiments have been depicted and described in detail herein, skilled artisans know that various modifications, additions, substitutions and the like can be made without departing from this disclosure. As such, these modifications, additions, substitutions and the like are considered to be within this disclosure.

What is claimed is:

1. A device, comprising:
a bracket including a first clip, a second clip, a third clip, a first plate, and a second plate, wherein the first clip includes a first base and a first pair of fingers extending from the first base such that the first pair of fingers oppose each other, wherein the second clip includes a second base and a second pair of fingers extending from the second base such that the second pair of fingers oppose each other, wherein the third clip includes a third base and a third pair of fingers extending from the third base such that the third pair of fingers oppose each other, wherein the second base spans between the first base and the third base, wherein each of the first base, the second base, and the third base are level and coplanar with each other, wherein each of the first base and the third base is wider than the second base, wherein the bracket is capable of simultaneously engaging (1) a first tubular member by the first clip and the third clip when the first tubular member extends along the second base between the first pair of fingers and between the third pair of fingers and (2) a second tubular member by the second clip when the second tubular member extends between the second pair of fingers along the first tubular member and the first base or the third base such that the second base extends between the first tubular member and the second tubular member, wherein the first plate spans between one finger from the first pair of fingers and one finger from the third pair of fingers and the second plate spans between one finger from the first pair of fingers and one finger from the third pair of fingers such that the first plate and the second plate oppose each other when the first tubular member extends along the second base between the first pair of fingers and between the third pair of fingers, wherein the first plate has a first bore and the second plate has a second bore, wherein the first bore and the second bore are structured to receive a shank of a fastener such that (i) the second base opposes the shank when the shank spans between the first plate and the second plate and (ii) a nut can be threaded onto the shank to control how spaced apart are the first plate and the second plate when the second plate extends between the first plate and the nut, wherein the first bore and the second bore are positioned to avoid overlap with the first clip and the third clip.

2. The device of claim 1, wherein the second tubular member extends between the second pair of fingers along the first tubular member, the first base, and the third base such that the second base extends between the first tubular member and the second tubular member.

3. The device of claim 1, wherein the second tubular member extends between the second pair of fingers along the first tubular member and the first base or the third base such that the second base extends between the first tubular member and the second tubular member as the first tubular member is parallel to the second tubular member or vice versa.

4. The device of claim 1, wherein the second tubular member extends between the second pair of fingers along the first tubular member and the first base or the third base such that the second base extends between the first tubular member and the second tubular member as the first tubular member is not parallel to the second tubular member or vice versa.

5. The device of claim 1, wherein the second tubular member extends between the second pair of fingers along the first tubular member and the first base or the third base such that the second base extends between the first tubular member and the second tubular member as the first tubular member extends along a first plane and the second tubular member extends along a second plane intersecting the first plane or vice versa.

6. The device of claim 5, wherein the second plane intersects the first plane or vice versa at an angle between about 5 degrees and about 175 degrees.

7. The device of claim 6, wherein the angle is between about 85 degrees and about 95 degrees.

8. The device of claim 7, wherein the angle is about 90 degrees.

9. The device of claim 1, wherein each finger of the first pair of fingers and the third pair of fingers is longitudinally rectilinear.

10. The device of claim 1, wherein each finger of the first pair of fingers and the third pair of fingers is longitudinally non-rectilinear.

11. The device of claim 10, wherein each finger of the first pair of fingers and the third pair of fingers is longitudinally zigzag.

12. The device of claim 10, wherein each finger of the first pair of fingers and the third pair of fingers is longitudinally arcuate.

13. The device of claim 1, wherein each finger of the second pair of fingers is longitudinally rectilinear.

14. The device of claim 1, wherein each finger of the second pair of fingers is longitudinally non-rectilinear.

15. The device of claim 14, wherein each finger of the second pair of fingers is longitudinally zigzag.

16. The device of claim 14, wherein each finger of the second pair of fingers is longitudinally arcuate.

17. The device of claim 1, wherein each finger in the first pair of fingers, the second pair of fingers, and the third pair of fingers is longitudinally zigzag.

18. The device of claim 1, wherein the second base is monolithic with the first base or the third base.

19. The device of claim 18, wherein the second base is monolithic with the first base and the third base.

20. The device of claim 1, wherein each finger in the first pair of fingers and the third pair of fingers extends along a plane extending through the second base.

21. The device of claim 20, wherein each finger in the first pair of fingers and the third pair of fingers extends parallel along the plane extending through the second base.

22. The device of claim 1, wherein each finger in the first pair of fingers or the third pair of fingers has a different longitudinal extension from each finger of the second pair of fingers.

23. The device of claim 22, wherein each finger in the first pair of fingers and the third pair of fingers has the different longitudinal extension from each finger of the second pair of fingers.

24. The device of claim 22, wherein the different longitudinal extension is length.

25. The device of claim 22, wherein the different longitudinal extension is shape.

26. The device of claim 22, wherein the different longitudinal extension is size.

27. The device of claim 1, wherein one finger in the first pair of fingers and one finger in the third pair of fingers are spaced apart from each other such that an open space is defined therebetween.

28. The device of claim 27, wherein the open space is longitudinally longer than the second base.

29. The device of claim 1, wherein the first tubular member is a tube, a socket, or a bulb.

30. The device of claim 1, wherein the second tubular member is a tube, a socket, or a bulb.

31. The device of claim 1, wherein the first tubular member or the second tubular member extend within an air handling unit when the first tubular member is held by the first clip and the third clip or the second tubular member is held by the second clip.

32. The device of claim 31, wherein the air handling unit is an indoor unit of a mini-split air conditioner.

33. A method, comprising:
 causing a bracket to be accessed, wherein the bracket including a first clip, a second clip, a third clip, a first plate, and a second plate, wherein the first clip includes a first base and a first pair of fingers extending from the first base such that the first pair of fingers oppose each other, wherein the second clip includes a second base and a second pair of fingers extending from the second base such that the second pair of fingers oppose each other, wherein the third clip includes a third base and a third pair of fingers extending from the third base such that the third pair of fingers oppose each other, wherein the second base spans between the first base and the third base, wherein each of the first base, the second base, and the third base are level and coplanar with each other, wherein each of the first base and the third base is wider than the second base; and
 causing the bracket to simultaneously engage (1) a first tubular member by the first clip and the third clip when the first tubular member extends along the second base between the first pair of fingers and between the third pair of fingers and (2) a second tubular member by the second clip when the second tubular member extends between the second pair of fingers along the first tubular member and the first base or the third base such that the second base extends between the first tubular member and the second tubular member, wherein the first plate spans between one finger from the first pair of fingers and one finger from the third pair of fingers and the second plate spans between one finger from the first pair of fingers and one finger from the third pair of fingers such that the first plate and the second plate oppose each other when the first tubular member extends along the second base between the first pair of fingers and between the third pair of fingers, wherein the first plate has a first bore and the second plate has a second bore, wherein the first bore and the second bore are structured to receive a shank of a fastener such that (i) the second base opposes the shank when the shank spans between the first plate and the second plate and (ii) a nut can be threaded onto the shank to control how spaced apart are the first plate and the second plate when the second plate extends between the first plate and the nut, wherein the first bore and the second bore are positioned to avoid overlap with the first clip and the third clip.

34. A method, comprising:
supplying a bracket to a user, wherein the bracket including a first clip, a second clip, a third clip, a first plate, and a second plate, wherein the first clip includes a first base and a first pair of fingers extending from the first base such that the first pair of fingers oppose each other, wherein the second clip includes a second base and a second pair of fingers extending from the second base such that the second pair of fingers oppose each other, wherein the third clip includes a third base and a third pair of fingers extending from the third base such that the third pair of fingers oppose each other, wherein the second base spans between the first base and the third base, wherein each of the first base, the second base, and the third base are level and coplanar with each other, wherein each of the first base and the third base is wider than the second base, wherein the bracket is capable of simultaneously engaging (1) a first tubular member by the first clip and the third clip when the first tubular member extends along the second base between the first pair of fingers and between the third pair of fingers and (2) a second tubular member by the second clip when the second tubular member extends between the second pair of fingers along the first tubular member and the first base or the third base such that the second base extends between the first tubular member and the second tubular member, wherein the first plate spans between one finger from the first pair of fingers and one finger from the third pair of fingers and the second plate spans between one finger from the first pair of fingers and one finger from the third pair of fingers such that the first plate and the second plate oppose each other when the first tubular member extends along the second base between the first pair of fingers and between the third pair of fingers, wherein the first plate has a first bore and the second plate has a second bore, wherein the first bore and the second bore are structured to receive a shank of a fastener such that (i) the second base opposes the shank when the shank spans between the first plate and the second plate and (ii) a nut can be threaded onto the shank to control how spaced apart are the first plate and the second plate when the second plate extends between the first plate and the nut, wherein the first bore and the second bore are positioned to avoid overlap with the first clip and the third clip.

35. A method, comprising:
manufacturing a bracket to a user, wherein the bracket including a first clip, a second clip, a third clip, a first plate, and a second plate, wherein the first clip includes a first base and a first pair of fingers extending from the first base such that the first pair of fingers oppose each other, wherein the second clip includes a second base and a second pair of fingers extending from the second base such that the second pair of fingers oppose each other, wherein the third clip includes a third base and a third pair of fingers extending from the third base such that the third pair of fingers oppose each other, wherein the second base spans between the first base and the third base, wherein each of the first base, the second base, and the third base are level and coplanar with each other, wherein each of the first base and the third base is wider than the second base, wherein the bracket is capable of simultaneously engaging (1) a first tubular member by the first clip and the third clip when the first tubular member extends along the second base between the first pair of fingers and between the third pair of fingers and (2) a second tubular member by the second clip when the second tubular member extends between the second pair of fingers along the first tubular member and the first base or the third base such that the second base extends between the first tubular member and the second tubular member, wherein the first plate spans between one finger from the first pair of fingers and one finger from the third pair of fingers and the second plate spans between one finger from the first pair of fingers and one finger from the third pair of fingers such that the first plate and the second plate oppose each other when the first tubular member extends along the second base between the first pair of fingers and between the third pair of fingers, wherein the first plate has a first bore and the second plate has a second bore, wherein the first bore and the second bore are structured to receive a shank of a fastener such that (i) the second base opposes the shank when the shank spans between the first plate and the second plate and (ii) a nut can be threaded onto the shank to control how spaced apart are the first plate and the second plate when the second plate extends between the first plate and the nut, wherein the first bore and the second bore are positioned to avoid overlap with the first clip and the third clip.

36. A device, comprising:
a bracket including a first clip, a second clip, a third clip, a first plate, and a second plate, wherein the first clip has a first base, wherein the second clip has a second base, wherein the third clip has a third base, wherein each of the first base, the second base, and the third base are level and coplanar with each other, wherein each of the first base and the third base is wider than the second base, wherein the second base spans between the first base and the third base to enable the bracket to be capable of simultaneously engaging (i) a first tubular member by the first clip and the third clip and (ii) a second tubular member by the second clip as the first tubular member extends along the second tubular member, wherein the first plate spans between the first clip and the third clip and the second plate spans between the first clip and the third clip such that the first plate and the second plate oppose each other when the first tubular member extends along the second clip between the first clip and between the third clip, wherein the first plate has a first bore and the second plate has a second bore, wherein the first bore and the second bore are structured to receive a shank of a fastener such that (i) the second clip opposes the shank when the shank spans between the first plate and the second plate and (ii) a nut can be threaded onto the shank to control how spaced apart are the first plate and the second plate when the second plate extends between the first plate and the nut, wherein the first bore and the second bore are positioned to avoid overlap with the first clip and the third clip.

37. The device of claim 1, wherein at least one of the first pair of fingers, the second pair of fingers, or the third pair of fingers includes a pair of fingers each of which is longitudinally zigzag as shaped by a proximal portion, a medial portion, and a distal portion where (i) the medial portion spans between the proximal portion and the distal portion, (ii) the proximal portion extends inwardly from a respective base, (iii) the medial portion is angled to extend outwardly, and (iv) the distal portion extends outwardly from the medial portion.

38. The device of claim 37, wherein at least two of the first pair of fingers, the second pair of fingers, or the third pair of fingers includes the pair of fingers.

39. The device of claim 38, wherein each of the first pair of fingers, the second pair of fingers, or the third pair of fingers includes the pair of fingers.

40. The device of claim 37, wherein the first pair of fingers and the third pair of fingers includes the pair of fingers.

41. The device of claim 37, wherein the second pair of fingers and at least one of the first pair of fingers or the third pair of fingers includes the pair of fingers.

42. The device of claim 1, wherein the first base, the second base, and the third base collectively present as an H-shape when viewed from above.

* * * * *